United States Patent
Charlier et al.

(10) Patent No.: US 8,493,364 B2
(45) Date of Patent: Jul. 23, 2013

(54) DUAL SIDED TRANSPARENT DISPLAY MODULE AND PORTABLE ELECTRONIC DEVICE INCORPORATING THE SAME

(75) Inventors: Michael L Charlier, Palatine, IL (US); Thomas E Gitzinger, Libertyville, IL (US); Jeong J Ma, Long Gove, IL (US); Tom R Schirtzinger, Fontana, WI (US)

(73) Assignee: Motorola Mobility LLC, Libertyville, IL (US)

( * ) Notice: Subject to any disclaimer, the term of this patent is extended or adjusted under 35 U.S.C. 154(b) by 509 days.

(21) Appl. No.: 12/433,312

(22) Filed: Apr. 30, 2009

(65) Prior Publication Data

US 2010/0277439 A1    Nov. 4, 2010

(51) Int. Cl.
*G06F 3/042* (2006.01)
(52) U.S. Cl.
USPC ............ 345/176; 345/173; 345/182; 345/183
(58) Field of Classification Search
USPC .................................. 345/173–179, 182–183
See application file for complete search history.

(56) References Cited

U.S. PATENT DOCUMENTS

| | | | |
|---|---|---|---|
| 5,543,588 A | 8/1996 | Bisset et al. | |
| 5,729,219 A | 3/1998 | Armstrong et al. | |
| 5,896,575 A | 4/1999 | Higginbotham et al. | |
| 5,959,260 A | 9/1999 | Hoghooghi et al. | |
| 6,492,979 B1 | 12/2002 | Kent et al. | |
| 6,504,530 B1 | 1/2003 | Wilson et al. | |
| 6,597,347 B1 | 7/2003 | Yasutake | |
| 6,927,747 B2 * | 8/2005 | Amirzadeh et al. | 345/4 |
| 7,075,513 B2 | 7/2006 | Silfverberg et al. | |
| 7,123,243 B2 | 10/2006 | Kawasaki et al. | |
| 7,205,959 B2 | 4/2007 | Henriksson | |
| 7,466,294 B2 | 12/2008 | Yamazaki et al. | |
| 7,622,863 B2 | 11/2009 | Seo et al. | |
| 2003/0184528 A1 | 10/2003 | Kawasaki et al. | |
| 2004/0169624 A1 | 9/2004 | Yamazaki et al. | |

(Continued)

FOREIGN PATENT DOCUMENTS

| | | |
|---|---|---|
| JP | 05-324122 A | 12/1993 |
| WO | 9838822 A1 | 9/1998 |
| WO | 0208881 A | 1/2002 |
| WO | 2008030563 A2 | 3/2008 |

OTHER PUBLICATIONS

Erh-Li (Early) Shen et al, "Double-Side Multi-touch Input for Mobile Device", CHI 2009-Difital Life, New World; conference Proceedings and Extended Abstracts: The 27th Annual CHI Conference on Human Factors in Computing Systems, Apr. 4-9, 2009, in Boston, USA, ACM Association for computing Machinery, US Apr. 4, 2009, pp. 4339-4344.

(Continued)

*Primary Examiner* — Kevin M Nguyen
*Assistant Examiner* — Cory Almeida (57) ABSTRACT

A dual sided transparent display module and an electronic device incorporating the same are provided. The dual sided transparent display module includes a primary transparent display having a first surface side and a second surface side. The transparent display module further includes a first side touch sensor array and a second side touch sensor array respectively located at the first surface side and the second surface side of the primary transparent display. The transparent display module still further includes a shutter element located at one of the first surface side and the second surface side of the primary transparent display.

20 Claims, 7 Drawing Sheets

U.S. PATENT DOCUMENTS

| | | |
|---|---|---|
| 2004/0263056 A1 | 12/2004 | Seo et al. |
| 2005/0024339 A1 | 2/2005 | Yamazaki |
| 2006/0092355 A1 | 5/2006 | Yang et al. |
| 2006/0197753 A1 | 9/2006 | Hotelling |
| 2006/0284853 A1 | 12/2006 | Shapiro |
| 2007/0075915 A1 | 4/2007 | Cheon et al. |
| 2007/0103454 A1 | 5/2007 | Elias |
| 2007/0177803 A1 | 8/2007 | Elias et al. |
| 2008/0211783 A1 | 9/2008 | Hotelling et al. |
| 2009/0298547 A1 | 12/2009 | Kim et al. |
| 2009/0315834 A1 | 12/2009 | Nurmi et al. |
| 2010/0277420 A1 | 11/2010 | Charlier et al. |
| 2010/0277421 A1 | 11/2010 | Charlier et al. |
| 2010/0277439 A1 | 11/2010 | Charlier et al. |

OTHER PUBLICATIONS

Danile Wigdor, et al: "Lucid Touch; A See-Through Mobile Device", UIST 2007, Proceedings of the 20th Annual ACM Symposium on User Interface Software and Technology, Oct. 7-10, 2007, Newport, Rhode Island, USA; [ACM Symposium on User Interface Software and Technology], New York, NY, ACM, US 7 Oct. 2007, pp. 269-278.

Arranz, Jose: "The International Search Report and the Written Opinion of the International Searching Authority", European Patent Office, Rimswijk, completed: Jul. 1, 2010, mailed Jul. 7, 2010, all pages.

United States Patent and Trademark Office, "Non-Final Office Action Summary", Jul. 25, 2011, pp. 1-30, U.S. Appl. No. 12/343,259.

Patent Cooperation Treaty, "PCT Search Report and Written Opinion of the International Searching Authority" for International Application No. PCT/US2010/031871 Dec. 6, 2010, 8 pages.

United States Patent and Trademark Office, "Final Rejection", for U.S. Appl. No. 12/433,253, dated Feb. 16, 2012, 29 pages.

Patent Cooperation Treaty, "PCT Search Report and Written Opinion of the International Searching Authority" for International Application No. PCT/US2008/088362, Oct. 8, 2009, 12 pages.

United States Patent and Trademark Office, "Non-Final Rejection" for U.S. Appl. No. 12/343,259 dated Sep. 7, 2012, 21 pages.

United States Patent and Trademark Office, "No Final Rejection" for U.S. Appl. No. 12/433,275 dated Oct. 6, 2011, 42 pages.

* cited by examiner

DUAL SIDED TRANSPARENT DISPLAY MODULE AND PORTABLE ELECTRONIC DEVICE INCORPORATING THE SAME

FIELD OF THE INVENTION

The present invention relates generally to display modules for use in portable electronic devices, and more particularly, to dual sided transparent display modules.

BACKGROUND OF THE INVENTION

With the trend for smaller hand held devices, such as cell phones, and the need to continue to generally reserve surface space for the positioning of interactive elements for purposes of enabling the user to interact with the device, the use of touch sensitive displays, which enable a device to visually convey information to a user, as well as enable a user to interact contextually with displayed object and otherwise provide user input to the device is increasingly being used. Touch sensitive displays merge input and output functions for some portable electronic devices, which in absence of the use of a similar and/or alternative form of input/output merging capability might otherwise require their own dedicated portions of the device surface. For example, many devices have historically incorporated a separate display and keypad on distinct portions of the external surface of the device.

However, some device designs have been able to extend the size of the display by extending it to include the surface space of the device that might otherwise have been separately dedicated to the location of a keypad. In some such instances, keypad-like input capabilities have been provided and/or maintained through the use of touch sensitive capabilities built into the extended display. One of the benefits of such a merger is the ability to dynamically change the size, shape and arrangement of keys, where each key can correspond to a subset of the surface space of the touch sensitive display associated therewith. Furthermore, each key can be accompanied by a visual indication, generally, through the integrated display, and more specifically the portions of the display that are currently active for providing each currently permissible form of user key selection and/or the immediately adjacent portions.

However one of the difficulties associated with touch screen displays includes the possibility that portions of the display become obstructed by one's fingers or hands in circumstances during which the user is simultaneously attempting to provide user input through the touch sensitive display interface, while one is attempting to view the information being presented via the display. Furthermore, interaction with the display with one's fingers can often leave smudges, which while they do not generally affect the operation of the device, can sometimes affect the appearance of the device, and may also impact the perceived image quality.

Consequently, some devices have incorporated touch sensitive surfaces that are located on the back side of the device, which are intended for use by the user to interact with and/or select items, which are being displayed on the front side of the device. However sometimes it can be less than clear which location on the front facing display corresponds to particular position being currently touched on the back of the device.

The use of a touch sensitive surface not only allows for the location of an interacting object, such as a pointer, to be identified by the device, but the movement of the interacting object can be similarly tracked as a function of time as the interacting object moves across the touch surface, in many instances. In this way, it may be possible to detect gestures, which can be mapped to and used to distinguish a particular type of function that may be desired to be implemented relative to the device and/or one or more selected objects. In some instances, multiple pointer gestures have been used to more intuitively identify some desired functions, such as the two finger pinching or spreading motion, which has sometimes been used to zoom in and zoom out.

However, multi-pointer gestures have generally been defined relative to a single touch sensitive input surface. Further, when one holds a device it is common for one's hand to wrap around the side of the device from the back of the device to the front of the device. Correspondingly, the present inventors have recognized that it would be beneficial to enable interactions with multiple sides of the device to be tracked for purposes of defining interactive gestures including interactive gestures involving multiple pointers, and for purposes of detecting the same. In this way some gestures can be integrated and or made more compatible with an action which is similarly intended to grip or hold an object. Still further, the present inventors have recognized that it would be beneficial if the user could more readily correlate a particular point associated with the back of the device, with which the user is currently interacting, and the corresponding point or object being displayed on the screen, which is visible via the front of the device.

SUMMARY OF THE INVENTION

The present invention provides a dual sided transparent display module. The dual sided transparent display module includes a primary transparent display having a first surface side and a second surface side. The transparent display module further includes a first side touch sensor array and a second side touch sensor array respectively located at the first surface side and the second surface side of the primary transparent display. The transparent display module still further includes a shutter element located at one of the first surface side and the second surface side of the primary transparent display.

In at least one embodiment, the dual sided transparent display module further includes a secondary transparent display located at the second surface side of the primary transparent display.

In at least a further embodiment, the dual sided transparent display module further includes one or more spacers located around at least portions of an exterior edge surface of the primary transparent display, where at least one or more of the first side touch sensor and any shutter element located at the first side surface of the primary transparent display is coupled to at least one of the one or more spacers, so as to be positioned a distance away from the primary transparent display. The distance between the at least one or more of the first side touch sensor and any shutter element located at the first side surface of the primary transparent display and the primary transparent display is defined at least in part by the size and shape of at least one of the one or more spacers.

In some of these further embodiments, the at least one or more of the first side touch sensor and any shutter element located at the first side surface of the primary transparent display is coupled to the at least one of the one or more spacers via one or more force sensors.

The present invention further provides a portable electronic device having a two part housing, where each part of the two part housing moves relative to the other part of the two part housing. The two part housing includes a first housing part having a dual sided transparent display module. The dual sided transparent display module includes a primary transparent display having a first surface side and a second surface side substantially parallel to an image plane. A first side touch sensor array and a second side touch sensor array included as part of the dual sided transparent display module are respectively located at the first surface side and the second surface side of the primary transparent display. A shutter element similarly included as part of the dual sided transparent display module is located at one of the first surface side and the second surface side of the transparent display. The two part housing additionally includes a second housing part having a single sided display module, the single sided display module includes a display having an image plane, and a touch sensor. The first housing part moves relative to the second housing, so as to have at least two use positions, where in a first use position the dual sided transparent display module of the first housing part at least partially overlaps in a direction perpendicular to the image plane of the primary transparent display with the display of the second housing part, and where in a second use position the dual sided transparent display module of the first housing part and the display of the second housing part do not substantially overlap in a direction perpendicular to the image plane of the primary transparent display.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. Furthermore, while the various figures are intended to illustrate the various claimed aspects of the present invention, in doing so, the elements are not necessarily intended to be drawn to scale. In other word, the size, shape and dimensions of some layers, features, components and/or regions for purposes of clarity or for purposes of better describing or illustrating the concepts intended to be conveyed may be exaggerated and/or emphasized relative to other illustrated elements.

Figure 1:
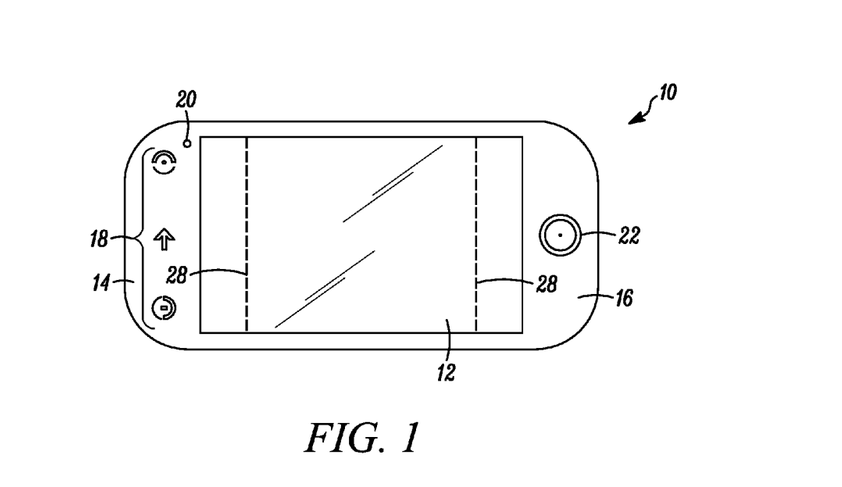
FIG. 1 is a plan view of an exemplary portable electronic device incorporating a dual sided transparent display module, in accordance with at least one embodiment of the present invention.

FIG. 1 illustrates a plan view of an exemplary portable electronic device 10 incorporating a dual sided transparent display module 12, in accordance with at least one embodiment of the present invention. In the illustrated embodiment, the display module 12 is generally centrally located relative to the front facing of the device 10, and generally provides a viewing characteristic and arrangement relative to the other features of the device 10, that enables one to see through the device 10 in at least portions of the area corresponding to the display, in a manner, which is at least somewhat similar to a window. While the display module 12 has a front surface and a back surface, as well as internal structure, the structure is largely comprised of transparent materials, partially transparent, or materials that can be selectively transparent, which enables one to see through the structure in order to see objects located on the other side of the device 10 and/or display in at least some operational modes, as well as view elements imaged by the display module 12 including in at least some instances from both sides of the display module 12.

In the particular embodiment illustrated, the front portion of the display module 12 extends across a significant portion of the front facing of the device 10 with the exception of areas 14, 16 to each of the left and the right of the display. For example to the left of the display, an area 14 incorporating a set of dedicated keys 18 is illustrated. This area 14 might correspond to the bottom of the device 10 when the device 10 is oriented in support of voice communications and can include a microphone 20, where the device might be positioned proximate the user's mouth for picking up voice signals via the microphone 20. Alternatively, the area 16 to the right of the display, which might correspond to the top of the device when oriented in support of voice communications, could include a speaker 22 for positioning proximate the user's ear for conveying reproduced audio signals, which could be encoded as part of a signal received by the device 10.

Figure 2:
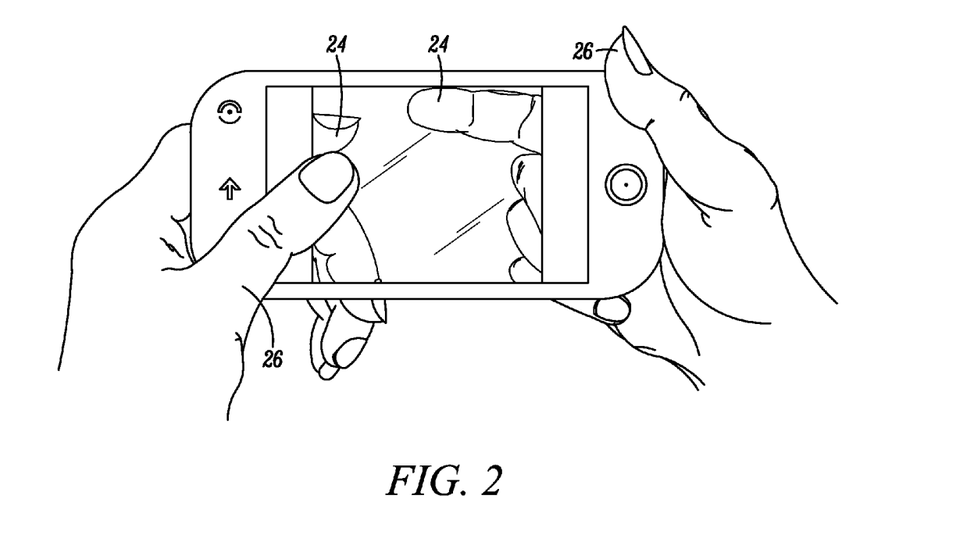
FIG. 2 is a further plan view of the exemplary portable electronic device, illustrated in FIG. 1, further highlighting an example of user interaction with the device.

As part of the display module 12, surfaces can be incorporated coinciding with each of the front side surface of the device 10 and the back side surface of the device 10 from which visual elements can be imaged so as to be viewable by a user. The surfaces of the display module 12 coinciding with each of the front side surface of the device 10 and the back side surface of the device 10 can also respectively include a touch sensitive input array, that can be used to track the location and movement of a pointer, for example a user's finger 24 or thumb 26, as illustrated in FIG. 2, and/or possibly a stylus or other pointer type device positioned proximate one or both surfaces of the device. The tracking of the location and the movement of a pointer enables the device to detect prearranged patterns or positions, thereby enabling the user to potentially interact with elements being displayed by one or more displays incorporated as part of the display module 12, and/or trigger the selection or start of one or more functions that can then be executed by the device 10.

By incorporating a touch sensitive surface on both sides of the device, the user can interact with the device by touching one or both surfaces. This enables a user to select displayed elements, and associate a desired command or interactive effect which can be used to select and/or manipulate a particular desired displayed element, or more generically a function relative to the device, itself. The interaction with a displayed element or the device 10 can be achieved through interactions with the touch sensitive surfaces of the display module 12 from either the front or the back. With respect to some gestures or interactions with the device 10 or a displayed element, in at least some instances, the effect may be the same regardless as to whether the gesture or interaction is performed relative to the front surface or back surface of the device 10. In other instances, the particular effect associated with a particular gesture or interaction may be different depending upon the side from which the gesture is performed and correspondingly detected. In still further instances, a gesture or interaction with the device 10 can incorporate a selected positioning and movement that tracks multiple separate pointer positions on the same or alternative surfaces. In this way various different gestures can be defined, so as to enable multiple types of interactions to be performed, relative to the display module or a selected displayed element.

Given the transparent nature of the display module 12, and the fact that the display module in some instances may be intended to be seen through from one side to the other, and can accommodate the display of image elements that can be seen through portions of the device and may in some circumstances be viewed from both sides of the device, the placement of other non-display related device elements, such as communication and control circuitry, processing circuitry and energy storage elements may be somewhat restricted. More specifically device elements that are not transparent, partially transparent, and/or selectively transparent, generally may not want to be placed in an area where it is intended for the user to be able to see through the corresponding portions of the display module, otherwise they could potentially be seen and/or could obstruct the ability of the user to see through the display module and the associated portions of the device. Consequently, many of the circuit elements, that are not associated with the transparent portions of the display, are placed in the areas that do not allow for the more window-like observations through the device.

In at least some embodiments, the size of the viewable display portion of the display module on one side of the device and correspondingly the display module may be of a different size than the viewable display portion of the display module on the other side of the device. In such an instance, the viewing side surface (front or back) of the display module 12 that is larger will likely extend into areas that do not have potentially transparent see through window-like characteristics. Such areas are similarly possible in instances where one window is not necessarily larger than the other, but in instances where the two viewing sides of the display module 12 are laterally offset to produce a potentially similar affect for each of the respective viewing sides.

One of the effects of such an area for one of the viewing sides of the display module 12, which does not have a respective see through arrangement, is the ability to have portions of the display which is viewable against an opaque background, and in which the information that is being displayed for such an area for the particular side is not viewable from the other side. Such non-transparent regions can be sized and arranged to increase the overall size of the viewable display, relative to a particular side, while providing some transparency for seeing through the device, which can then be used to better confirm the position of a pointer interacting with the touch sensitive back surface of the device and display module. Furthermore, the inclusion of the non-transparent regions within a given display area allows for an increase in the size of the areas, such as the left side area 14 and the right side area 16 described in connection with FIG. 1, that can be used to place non transparent device elements, such as the ones noted above, in areas which do not interfere with the more window-like effect of the transparent portions of the transparent display module 12.

Dashed lines 28, shown in FIG. 1, illustrate one potential boundary line for a smaller viewing portion associated with the back side surface of the device, which in turn limit the portions of the viewable area of the display associated with the front side surface of the device, through which the user can see in window-like fashion. FIG. 2 illustrates the potential impact such a smaller viewing area might have on the ability to see objects, such as pointing elements, that might be at least partially visible through the device.

Figure 3:
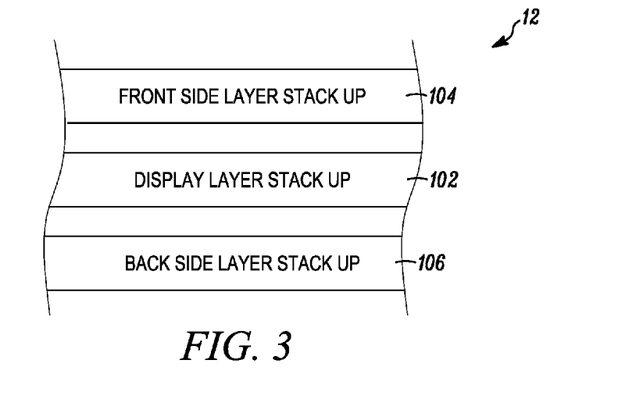
FIG. 3 is a partial cross sectional side view of a dual sided transparent display module, illustrating an arrangement of multiple sets of stacked layers, in accordance with at least some embodiments of the present invention.

FIG. 3 illustrates a partial cross sectional side view of a dual sided transparent display module 12, illustrating an arrangement of multiple sets of stacked layers, in accordance with at least some embodiments of the present invention. In the illustrated embodiment, the display module includes a display layer stack up 102, which includes one or more displays arranged and adapted for producing visual elements, that can be perceived by the user. In at least some instances, the displays are arranged as a plurality of separately addressable display elements, which can be separately actuated to produce a varied visual effect. In some of these instances a plurality of separately addressable elements, sometimes referred to as pixels, are arranged in a substantially planer two dimensional grid-like pattern. The pixels themselves often involve individual elements that can support at least a pair of states, that produce at least two different observable visual effects, such as a light being on or off, or an element being transparent or opaque. The visual state of multiple pixel elements can be controlled, and when viewed together can produce different visual images and effects.

On one side of the display layer stack up 102 is a front side layer stack up 104, which can include one or more different layers each generally intended to support one or more functional features, and on the other side of the display layer stack up 102 is a back side layer stack up 106, similarly involving one or more different layers. In at least some instances, the front side layer stack up 104 would generally correspond to layers on the side of the display layer stack up corresponding to the front side of the device 100 or front side of the display module 12, and the back side layer stack up 106 would generally correspond to layers on the side of the display layer stack up 102 corresponding to the back side of the device 100 or the back side of the display module 12. However, the terms front and back are relative and could easily be interchanged, but together generally refer to the elements corresponding to opposite sides. Furthermore, while three different stack up layers are shown and described, there is no requirement that they be separate or that there be three of them, and the layers could easily be viewed as a single layer stack up, or alternatively as any other suitable number of layer stack ups. Three was chosen in the present instance as one possible convenient way to describe the overall structure.

FIGS. 4A to 4D illustrate more detailed partial cross sectional side views of various examples of different layering configurations separately applicable to each of the front side layer stack up 104 and the back side layer stack up 106, illustrated in FIG. 3. Generally, the illustrated stack ups for each of the front side layer stack up 104 and the back side layer stack up 106 are arranged so that the top of the illustrated exemplary side layer stack ups correspond to the side of the stack up that is further away from the display layer stack up 102, and the bottom of the illustrated exemplary side layer stack ups correspond to the side of the stack up that is closer to the display layer stack up 102.

Figure 4A:
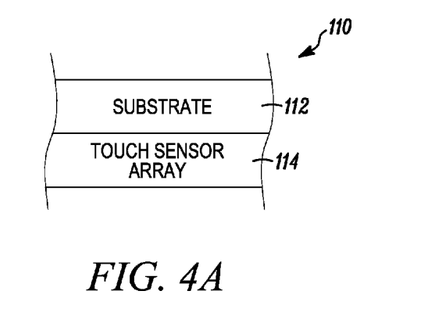
FIGS. 4A to 4D are more detailed partial cross sectional side views of various examples of different layering configurations separately applicable to each of the front side layer stack up and the back side layer stack up, illustrated in FIG. 3.

FIG. 4A corresponds to a first exemplary side layer stack up 110 for use as a front side layer stack up 104 or a back side layer stack up 106. The first exemplary side layer stack up includes a substrate 112 and a touch sensor array 114. The substrate 112 provides strength and support and in some instances protection. In at least some instances the layer can be formed from glass or other similar transparent substance to which the other layers can be applied, bonded, or adhered. It can also be used to provide a strong, durable and smooth front surface against which the pointer can interact. Beneath the substrate, a touch sensor array 114 layer can be used to detect the interaction and movement of the pointer relative to a surface, in this case the surface of the substrate 112. The touch sensor array 114 can make use of several different types of touch tracking types of technology, including touch technology that is capacitive and/or resistive in nature. However depending upon the type of technology selected it may be capable of detecting different types of pointers, as well as different types of interactions with the touch sensor array 114.

In the case of capacitive touch sensor arrays, the array can produce a detection field that can extend through a dielectric substrate, such as glass or plastic, and can be used to detect the proximity of a conductive mass that enters or disturbs the one or more fields. Generally, a touch sensor array 114 of this type will produce a plurality of electric fields, associated with a plurality of capacitive sensors which can be sensed to determine the presence and the current location of an encroaching conductive mass that has interacted with the respective fields. Such touch sensors are sometimes referred to as proximity touch sensor arrays.

In the case of resistive touch sensor arrays, the touch sensor array includes a plurality of points whereby the amount of pressure being applied can be detected. In such an instance an array of elements in which the resistance will vary dependent upon the amount of force applied can be used to not only detect the presence and location of a touch, but at the same time provide an estimate to the amount of force being applied. Such touch sensors are sometimes referred to as force sensing touch sensor arrays. Because the force sensing is local relative to each detection point, a form of direct and discreet contact with the array of touch sensors may need to be possible, which often limits the opportunities for the presence of and/or the type of intervening layers. A rigid intervening layer may interfere with the detection by an individual touch detector and/or the ability to differentiate between the multiple sensors, the particular location of the application of force by a user.

One skilled in the art will readily recognize that there exists still further types of touch detection technologies, each having their own set of limitations and features, which can be used without departing from the teachings of the present invention.

In the case of the embodiment illustrated in FIG. 4A, because the touch sensor is located beneath the substrate, in instances where the substrate is formed from a rigid material such as glass, a capacitive touch sensitive array might be well suited.

Figure 4B:
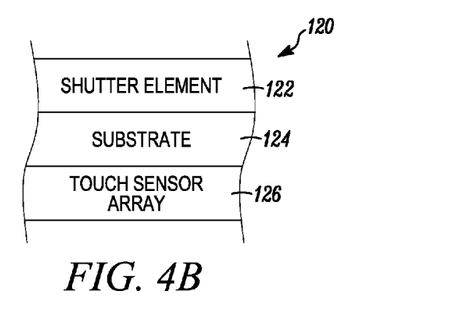
Figure 4C:
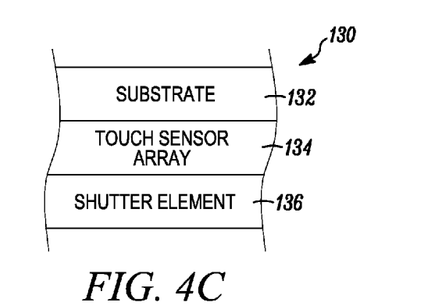

FIGS. 4B and 4C further illustrate still further examples of side layer stack ups 120 and 130, which additionally include a shutter element 122 and 136, respectively. The shutter element generally allows for making the display selectively transparent or opaque, where the position of the shutter relative to the one or more displays, will control which side of the display that the images produced by the displays can be viewed. In some instances a shutter might be used to restrict viewing of the display from one of the sides to enforce a sort of privacy mode. In other instances, the shutter could be used to give the external surface area of the device associated with the display a cleaner look, sometimes referred to as a dead front, when the device is off or certain modes of the device are inactive. In each instance relative to FIGS. 4B and 4C, the touch sensor array 126, 134 is located beneath the substrate 124, 132. In FIG. 4B, the shutter element 122 is located above the substrate 124 and the touch sensor array 126, and in FIG. 4C, the shutter element 136 is located beneath the substrate 132 and the touch sensor array 134.

In at least some instances the shutter element could be formed using a non-segmented liquid crystal display or a transflector layer, which enables the corresponding layer to transition between a first state which is at least partially transparent, and a second state which is substantially opaque.

Figure 4D:
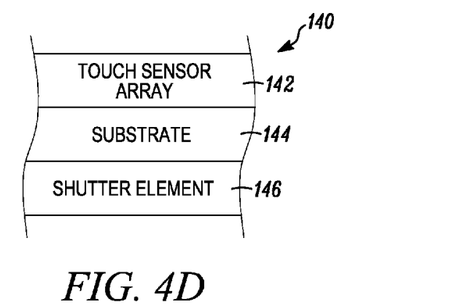

FIG. 4D illustrates a still further example of a side layer stack up 140. The side layer stack up 140 differs from the other exemplary side layer stack ups discussed relative to FIGS. 4A to 4C in so far as the touch sensor array 142 is located above the substrate 144, which as noted above places the touch sensor array 142 further away from the display layer stack up 102 relative to the other layers forming part of the particular side layer stack up 140. As noted above, this may be better suited to touch sensor arrays that are resistive in type, as it enables more direct interaction with the user and avoids an intervening substrate layer. The side layer stack up 140 further includes a shutter layer that is beneath the touch sensor array 142 and the substrate 144.

While several types of side layer stack ups have been described, one skilled in the art will readily appreciate, that still further types of stack ups are possible without departing from the teachings of the present invention. It is further possible that one of the described stack ups might be used in connection with the front side layer stack up 104, and that the same or a different one of the described stack ups might be used in connection with the back side layer stack up 106. For example, one such display module 12 might include a side layer stack up consistent with the side layer stack up 130 described in connection with FIG. 4C for use as the front side layer stack up 104, and include a side layer stack up consistent with the side layer stack up 140 described in connection with FIG. 4D for use as the back side layer stack up 106.

FIGS. 5A to 5D illustrate more detailed partial cross sectional side views of various examples of different layering configurations for the display layer stack up, illustrated in FIG. 3. While in some instances the display stack up may include a single display, such as the display stack up shown in FIG. 5A, in other instances multiple displays may be included. Where multiple displays are used, the general intent is to enable the possibility that elements displayed on the respective displays to be simultaneously viewable by a user in at least some operating modes or configurations. In such instances, the display elements might be viewed as being superimposed upon one another, which might give the display the appearance of some having some depth. In other instances the display might have discreet planes that are distinguishable by the user, whereby the user interaction with the displayed elements may be dependent upon the particular display upon which the corresponding element is being displayed. For example one of the displays may be associated with a foreground, and another one of the displays may be associated with a background.

A couple of examples of suitable display technologies that might be used with the present application includes an example of a non-light emitting display, such as liquid crystal type displays, or an example of a light emitting display, such as light emitting diode type displays, each of which can include individually addressable elements (i.e. pixels), that can be used to form the visual elements to be displayed. In at least one instance an organic light emitting diode display can be used. The advantage to using a light emitting type display is that a separate light source need not be used, such as backlighting or the use of a reflective back surface, for producing a user perceivable image, at least some of which would be difficult to incorporate in the context of a transparent window-like display.

Figure 5A:
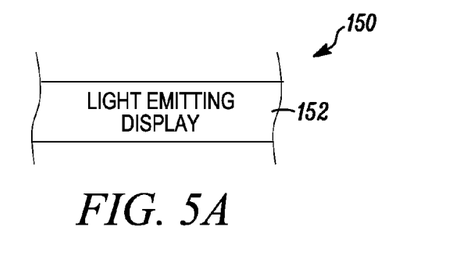
FIGS. 5A to 5D are more detailed partial cross sectional side views of various examples of different layering configurations for the display layer stack up, illustrated in FIG. 3.
Figure 5B:
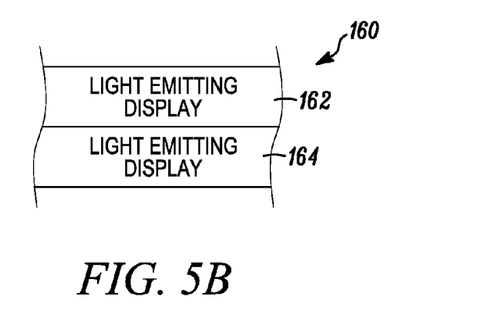
Figure 5C:
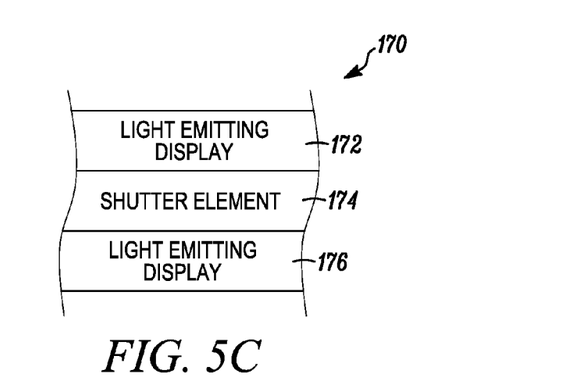

As noted above, FIG. 5A illustrates a display layer stack up 150 having a single display, and more specifically a light emitting display 152. FIG. 5B illustrates a further exemplary display layer stack up 160 including a pair of light emitting displays 162 and 164. FIG. 5C illustrates a still further exemplary display layer stack up 170 including a pair of light emitting displays 172 and 176. The exemplary display layer stack up 170 further includes a shutter element 174 layer positioned between each of the two displays 172 and 176. Such a shutter element would segregate the two displays from being seen through the opposite side of the display module 12, where when active the shutter element 174 would generally preclude any elements being presented by the light emitting display 176 from being seen from a first side of the display module 12, and would generally preclude any elements being presented by the light emitting display 172 from being seen from the other or second side of the display module 12.

Figure 5D:
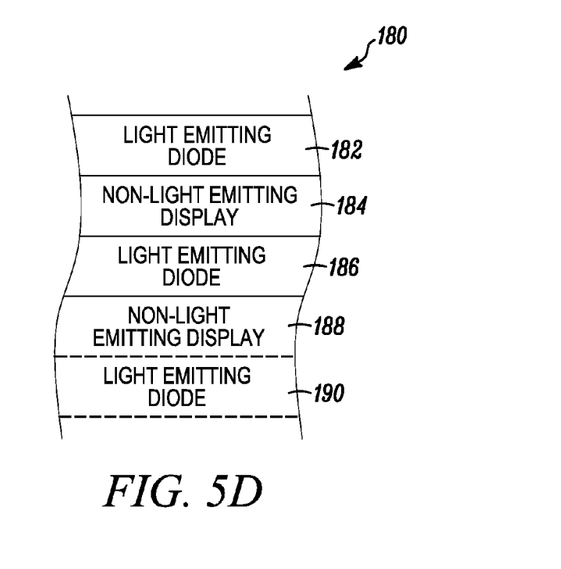

FIG. 5D illustrates yet a still further exemplary display layer stack up 180, which alternatively provides for the use of a non-light emitting display, including at least a first non-light emitting display 184. The non-light emitting display is sandwiched between a pair of substantially parallel light emitting diodes 182 and 186, which can provide a back light for increasing the visibility of the displayed elements in a respective one of the two viewing directions, where dependent upon which one of the two light emitting diodes is illuminated will serve to dictate in which direction the displayed elements will be more readily observable. Optionally, a still further non-light emitting display 188 and still further light emitting diode 190 could be placed next to one of the previously noted light emitting diodes 186. Such an arrangement would create a still further display upon which elements could be visually presented, and be seen from one or both sides of the display module 12, in at least some operating modes.

Figure 6:
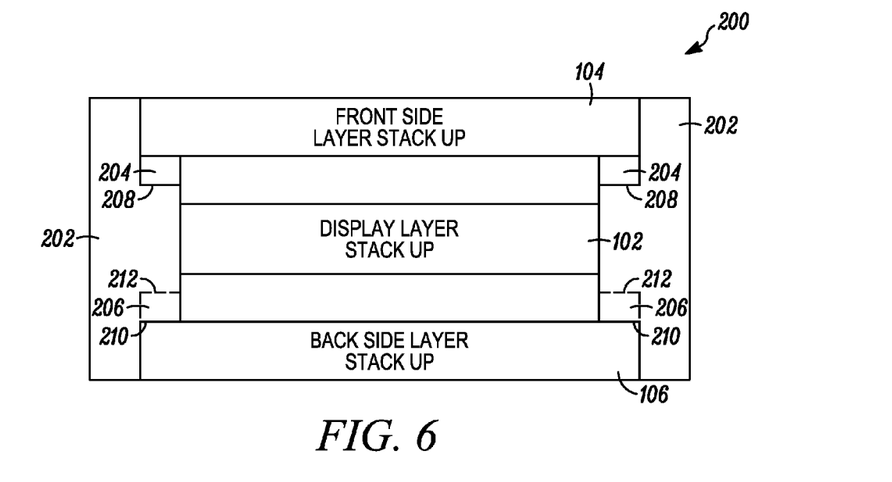
FIG. 6 is a cross sectional side view of a dual sided display module, illustrating the inclusion of one or more sets of force sensing elements.

FIG. 6 illustrates a cross sectional side view of a dual sided display module 200, illustrating the inclusion of one or more sets of force sensing elements 204. Similar to the display module 12 illustrated in FIG. 3, the dual sided display module 200, includes a display layer stack up 102 positioned between a front side layer stack up 104 and a back side layer stack up 106. The three sets of stack ups 102, 104 and 106 are arranged and held in place by a frame 202, which in the illustrated embodiment is stepped, so as to provide a surface 208 against which the front side layer stack up 104 can press up against, which enforces a spacing relative to the front side layer stack up 104, and the display layer stack up 102. In at least the illustrated embodiment, the front side layer stack up 104 potentially presses up against the stepped surface 208 of the frame 202 via a set of force sensors 204, such as a pair of force sensing resistors. In such an instance, the front side layer stack up 104 can be arranged, such that any interaction with the display surface through the use of a pointer involving an applied force can be detected and measured, thereby enhancing the positional detection of the touch sensor array and supplementing it with the sensing of a detected amount of force that the further set of force sensors can additionally provide.

A further step in the frame 202, similarly helps to enforce a relative spacing between the back side layer stack up 106, and the display layer stack up 102. In at least some instances, the back side layer stack up 106 can also support a force sensing functionality. In such an instance, a separate set of force sensors can be used to detect the amount of force applied to the back side layer stack up 106 pushing the same up against the set of force sensors 206, whose relative movement is restricted by a stepped surface 212. In absence of a corresponding set of force sensors used to detect the force generally applied to the back side layer stack up 106, the frame can alternatively include a stepped surface 210 that interacts more directly with the back side layer stack up 106.

While in FIG. 6 the use of a frame 102 is shown, the frame 202 could be a separate element that incorporates a spacer for producing the desired separation between different stack up layers. Alternatively the frame 202 and corresponding spacer could be integrated as part of a housing for the display module 12 or even the housing for the device 10, itself.

Figure 7:
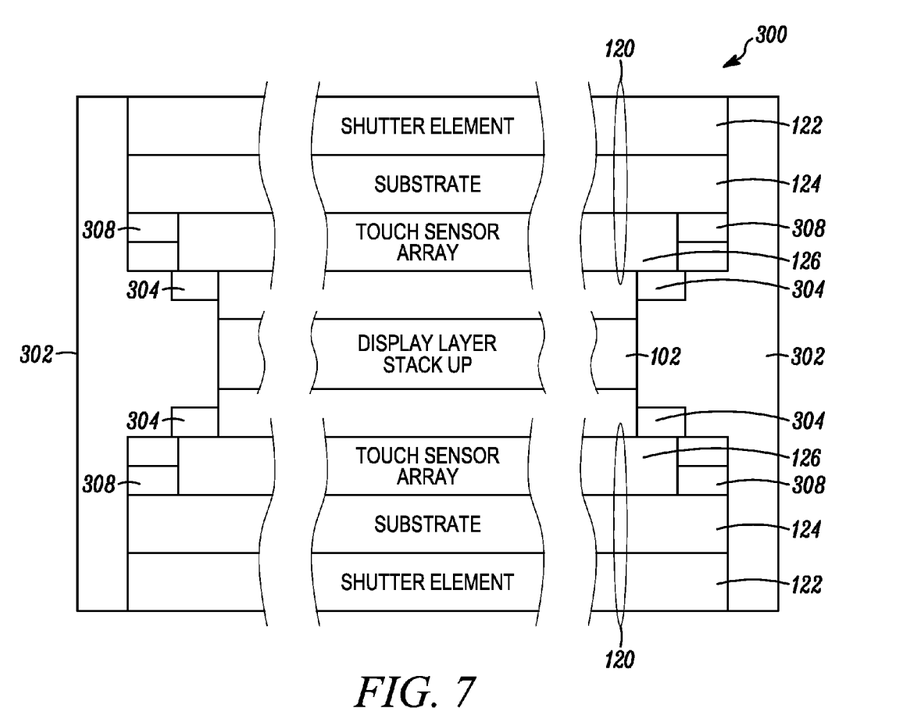
FIG. 7 is a partial cross sectional side view of a dual sided display module, illustrating the inclusion of one or more vibrational elements in addition to one or more sets of force sensing elements.

FIG. 7 illustrates a partial cross sectional side view of a dual sided display module 300, illustrating the inclusion of one or more vibrational elements 308 in addition to one or more sets of force sensing elements 304. In the particular embodiment illustrated, the display module includes a display layer stack up 102, as well as a front side and back side layer stack up 120. The front side and back side layer stack up 120 in the particular embodiment illustrated are similar to the side layer stack up 120 illustrated in FIG. 4B, and include a shutter element 122, a substrate 124 and a touch sensor array 126.

Each of the front side layer stack up 120 and the back side layer stack up 120 interfaces with a spacer frame 302 via respective sets of force sensors 304. Additionally included coupled to each of the side layer stack ups 120 are one or more sets of vibrational elements 308, which can be used to produce a vibrational effect, that can be felt through the side layer stack up 120. The vibrational effects can be used to provide haptic feedback, when the display surfaces are touched to provide a positive indication of an acceptance of a detected touch or gesture, or the produce an indication to verify a selection of a displayed element. The vibrational effects, which are possible through the attached vibrational elements 308, could also be used to support various features and functions of an application being executed by the device, such as a gaming application, where the vibrational effect helps to produce an expected effect associated with an action performed or experienced as part of the game, or could be used to provide an alert which can be felt to provide the user an indication of an incoming message or call.

Figure 8:
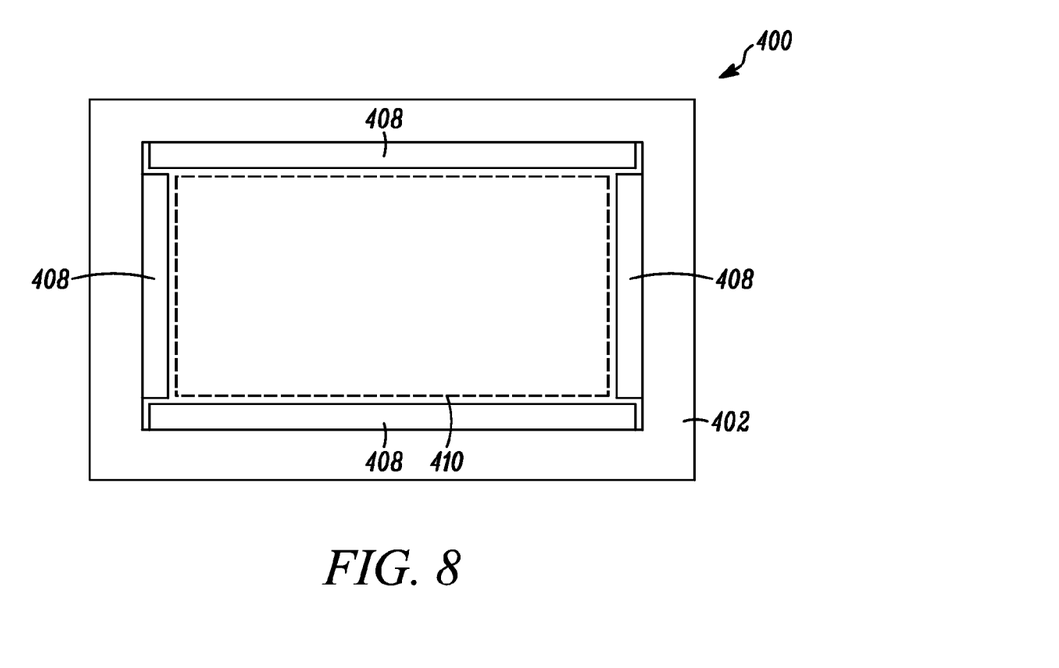
FIG. 8 is front plan view of an exemplary dual sided display module, in accordance with at least some embodiments of the present application.

FIG. 8 illustrates front plan view of an exemplary dual sided display module 400, in accordance with at least some embodiments of the present application. More specifically, the display module 400 illustrates a frame 402 within which one or more stack up layers can be placed having an anticipated viewable area defined by the boundary 410 illustrated using a dashed line. In conjunction with some of those layers, one or more vibrational elements could be affixed to one or both of the front side layer stack up and the back side layer stack up, which in turn could produce a vibration felt as part of an interaction with the associated one of the side layer stack ups. In the illustrated embodiments, the vibrational elements are strips 408 of piezo elements that extend along each of the respective sides of the display. It is further and/or additionally possible that other types of vibrational elements could similarly and/or alternatively be incorporated dependent upon the type of vibration desired, as well as the size and shape of the available space for placement and attachment of the vibrational elements.

Figure 9:
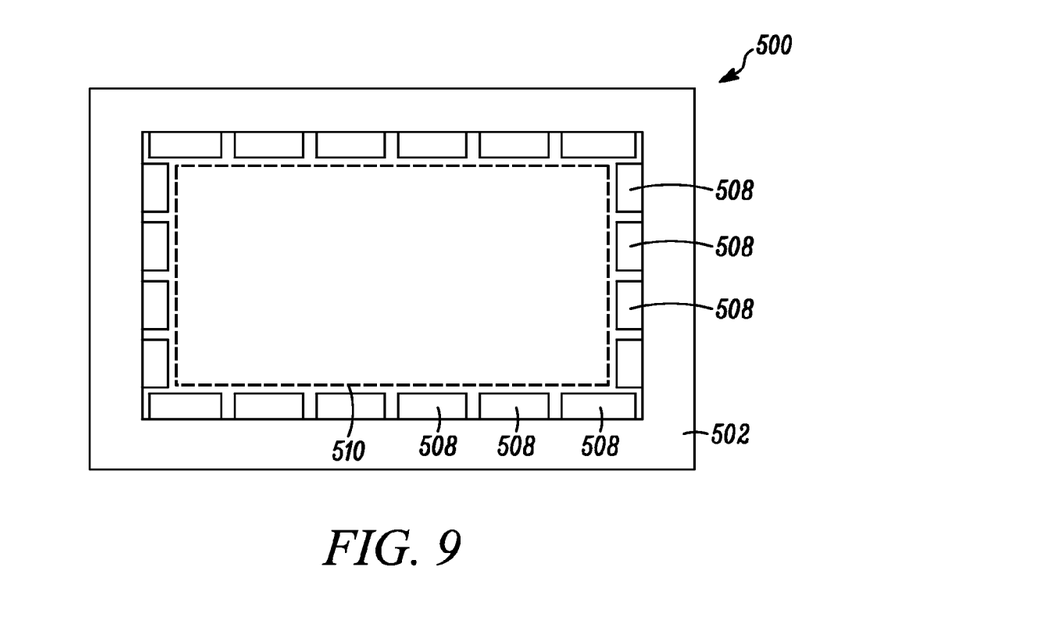
FIG. 9 is a front plan view of a further exemplary dual sided display module, in accordance with at least some embodiments of the present application.

In some instances, it may be desirable for the effects to be felt more locally at different points along the surface of the display, where multiple smaller piezo elements could be used to excite and/or dampen the vibration felt by the user. In some instances, the use of multiple smaller piezo elements might enable peak vibrations to be felt more proximate the area being pressed to provide a more localized feel. An example of one such alternative structure intended to provide a more localized feel, is illustrated in FIG. 9, where instead of strips which extend the full length of the sides of the display module, multiple smaller vibrational elements 508 are used. The plan view of the exemplary dual sided display module 500 illustrated in FIG. 9, similarly shows a frame 502 within which one or more stack up layers can be placed having an anticipated viewable area defined by the boundary 510 illustrated using a dashed line.

Figure 10:
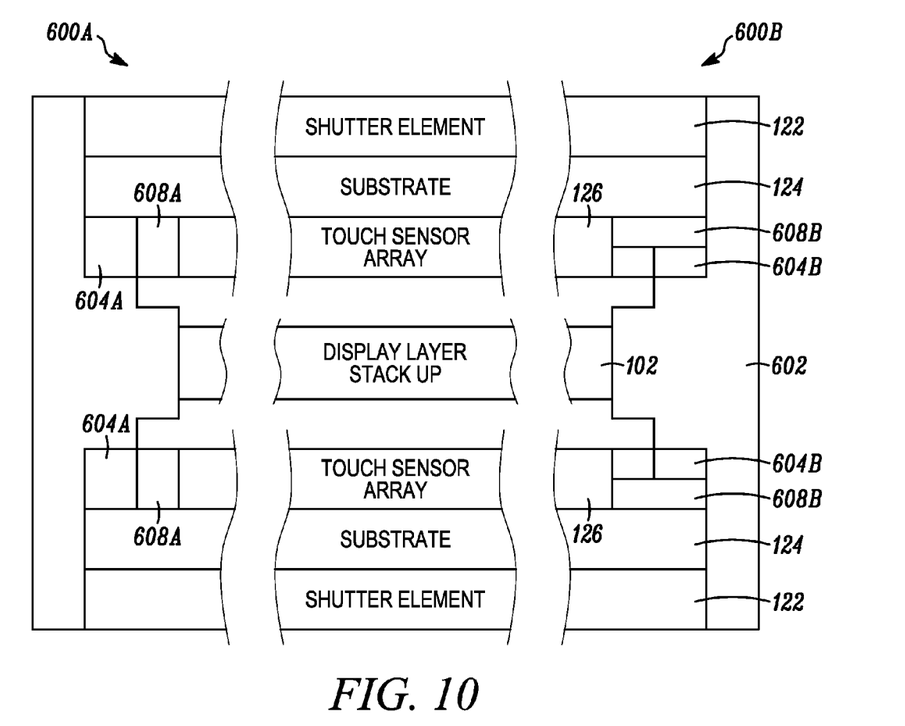
FIG. 10 illustrates still further partial cross sectional side views of a dual sided display module, illustrating the inclusion of one or more vibrational elements in addition to one or more sets of force sensing elements.

FIG. 10 illustrates a still further partial cross sectional side views of a dual sided display module 600A and 600B, illustrating a pair of configuration associated with the inclusion of one or more vibrational elements in addition to one or more sets of force sensing elements, which are substantially similar to the partial cross sectional side views of a dual sided display module 300 illustrated in FIG. 7. In the configuration illustrated in the left side of the partial cross sectional side view, the dual sided display module 600A includes force sensing elements 604A that are positioned side by side relative to the corresponding vibrational elements 608A, where the vibrational element 608A is positioned between the force sensing element 604 and the touch sensor array 126 in a direction generally parallel to the various layers.

In the right side of the partial cross sectional side view, the dual sided display module 600B includes force sensing elements 604B that are alternatively vertically stacked relative to respective vibrational elements 608B in a direction generally perpendicular to the various layers, where the layers 122, 124 and 126 described in association with the front side and back side layer stack ups 120 interact with the frame 602 via the vibrational element 608B and the force sensing element 604B. In the embodiment associated with the right side of the partial cross sectional side view 600B, the force sensing element 604B is positioned between the frame 602 and the vibrational element 608B, and the vibrational element 608B is between the force sensing element 604B and the substrate 124. The vibrational element 608B interacts more directly with the substrate 124 of the respective front or back side layer stack up 120, as the touch sensor array 126, does not extend the full width of the stack up.

By arranging the vibrational element 608B in a stacked vertical fashion relative to the force sensing element 604B in the space available between the respective stack up and the frame 602, the arrangement enables the vibrational element 608B to interact with the respective stack up across a greater surface area.

Figure 11:
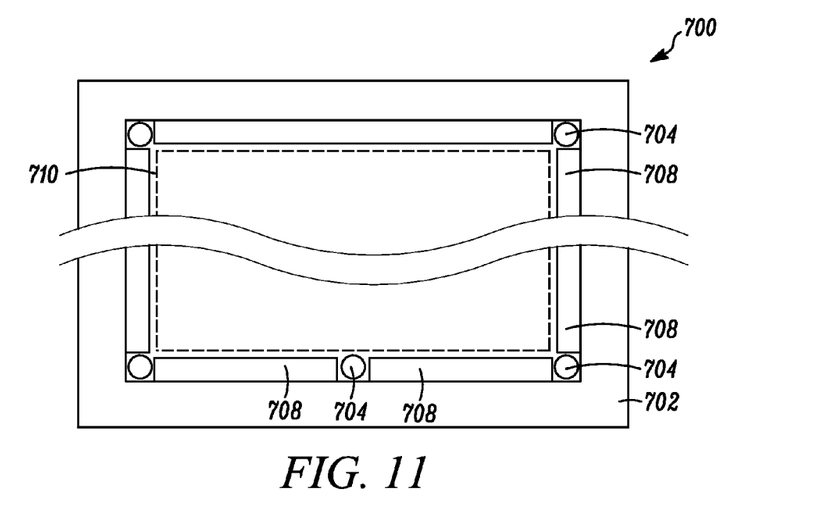
FIG. 11 illustrates still further partial front plan views of an exemplary dual sided display module, in accordance with at least some embodiments of the present application.

FIG. 11 illustrates still further partial front plan views of an exemplary dual sided display module, in accordance with at least some embodiments of the present application. Similar to the display module illustrated in FIG. 8, the display module 700 illustrates a frame 702 within which one or more stack up layers can be placed having an anticipated viewable area defined by the boundary 710 illustrated using a dashed line. In conjunction with some of those layers, one or more vibrational elements could be affixed to one or both of the front side layer stack up and the back side layer stack up, which in turn could produce a vibration felt as part of an interaction with the associated one of the side layer stack ups. In the illustrated embodiments, the vibrational elements are strips 708 of piezo elements that extend along each of the respective sides of the display.

In a first embodiment, illustrated in the upper portion of FIG. 11, the strips 708 of piezo elements generally extend the length of each of the sides in the form of a single element. At each of the corners a force sensing element 704 is provided. This differs from the lower portion of FIG. 11, corresponding to a slightly different version of the embodiment, where some of the strips 708 of piezo elements may be interrupted into multiple segments at one or more points along the length of the respective sides, and where a further force sensing element 704 may be inserted. This difference can be most readily seen when comparing the arrangement of strips 708 of piezo elements and the force sensing elements 704 associated with the upper side of the frame to the arrangement of strips 708 of piezo elements and the force sensing elements 704 associated with the lower side of the frame.

Different arrangements corresponding to the placements of piezo elements and force sensing elements, will produce different force transfer characteristics, when the user interacts with the display module via a pointer. One skilled in the art will readily appreciate that still further changes to the size and placement of these various elements can be used to further affect the types, amounts, and manner in which the various forces are detected or conveyed between the respective elements without departing from the teachings of the present application.

Figure 12:
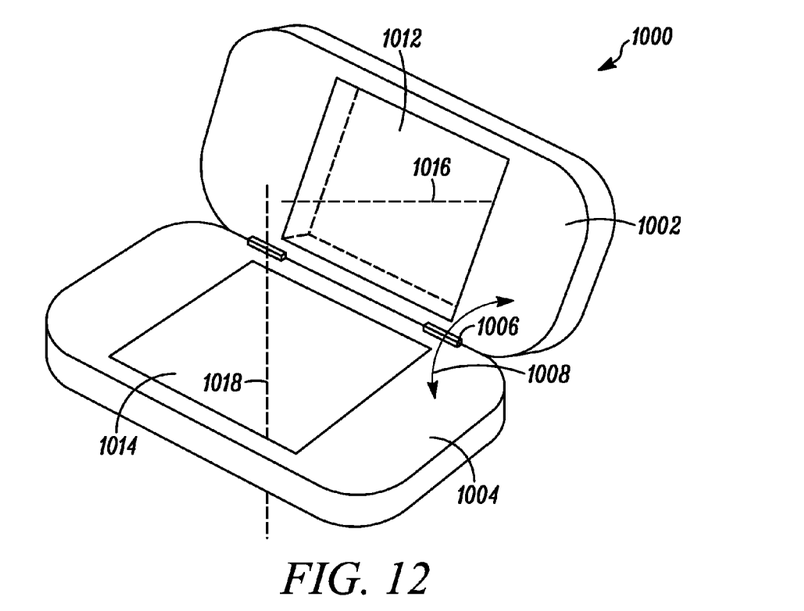
FIG. 12 is an isometric view of a portable electronic device having a two part housing, which incorporates a dual sided transparent display module, in accordance with at least one embodiment of the present invention.

FIG. 12 illustrates an isometric view of a portable electronic device 1000 having a two part housing, which incorporates a dual sided transparent display module, in accordance with at least one embodiment of the present invention. The two part housing includes a first housing 1002 and a second housing 1004, that move relative to one another, often between different use positions which each support different types of user interactions. In the illustrated embodiment, the two housings are arranged in a configuration commonly referred to a clam-shell configuration, and include the first housing 1002 being coupled to the second housing 1004 via one or more hinge mechanisms 1006. Such a coupling mechanism enables the first housing 1002 to move relative to the second housing in a manner that rotates 1008 about the hinged connection.

In the illustrated embodiment, each of the housings has a display module, which allows images to be visually presented to the user. In at least some instances, the display module associated with the first housing 1002, is a transparent dual sided display module 1012, which can be of the type illustrated and described above. Such a display module 1012 would enable elements presented on the display module 1012 as well as objects located behind the display module 1012 to be visible on or through the display portions of the display module 1012. In some use positions, such as an open position, the objects that might be visible through the display module 1012 might include one or more pointers used for interacting with a touch sensing capability associated with the respective surface of the display module 1012, such as a user's fingers or thumbs. In other use positions, such as a closed position, the objects that might be visible through the display module 1012 might include a display module 1014 associated with the second housing 1004 that may or may not have a similar transparent window-like effect. In instances where the display module 1014 does not have a transparent window-like effect, there is greater freedom in locating and arranging other components within the second housing 1004.

In essence, as shown, the portable electronic device 1000 includes at least a first use position where the display module of the first housing 1002 substantially overlaps with the display module of the second housing 1004 in a direction 1016 perpendicular to the image plane of the display module of the first housing 1002, and includes at least a second use position where the display module of the first housing 1002 does not substantially overlap with the display module of the second housing 1004, in the resulting perpendicular direction 1016. It is possible that there may be incidental overlap of the two displays as part of the second use position. However, generally any incidental remaining overlap is generally a fraction of the overlap in the other principal use position.

Figure 13:
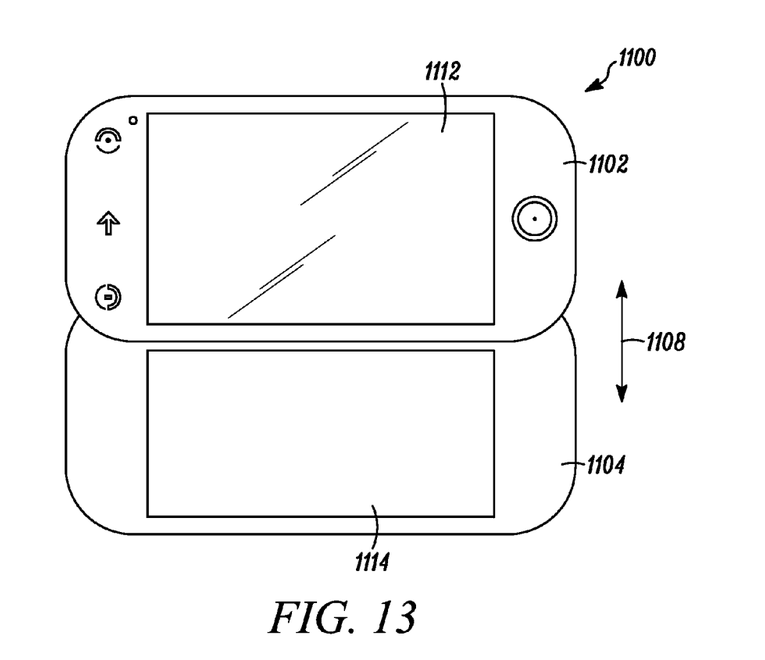
FIG. 13 is a front plan view of a further portable electronic device having a two part housing, similarly incorporating a dual sided transparent display module, in accordance with a still further embodiment of the present invention.

FIG. 13 illustrates a front plan view of a further portable electronic device 1100 having a two part housing 1102 and 1104, similarly incorporating a dual sided transparent display module 1112, in accordance with a still further embodiment of the present invention. The portable electronic device 1100, illustrated in FIG. 13, generally differs from the portable electronic device 1000 in the manner in which the two housings move relative to one another. More specifically, in the embodiment illustrated in FIG. 13, the first housing 1102 moves in a direction 1108 relative to the second housing 1104 in substantially parallel planes. This particular configuration is sometimes referred to as a slider configuration.

Similar to the portable electronic device 1000 illustrated in FIG. 12, the display module 1112 of the first housing 1102 is a dual sided transparent display module of the type to enable window-like effects. The second housing 1104, also includes a display module 1114, but one which may or may not have dual sided transparent display module characteristics. Such an arrangement is intended to similarly allow the display modules 1112 and 1114 of each of the respective housings 1102 and 1104 to substantially overlap in a first use position, where the display module 1114 associated with the second housing 1104 may be viewable through the display module 1112 of the first housing 1102, and to generally not overlap in a second use position with the possible exception of any generally minor insubstantial incidental overlap.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A dual sided transparent display module included as part of a single common housing part, the dual sided transparent display module comprising:
   a primary transparent display having a first surface side and a second surface side;
   a first side touch sensor array and a second side touch sensor array respectively located at the first surface side and the second surface side of the primary transparent display;
   a shutter element located at one of the first surface side and the second surface side of the primary transparent display, the shutter having a first state and a second state, wherein when the shutter is in the first state, the shutter enables one to see through the display module like a window, and wherein when the shutter is in the second state, the shutter becomes substantially opaque thereby precluding one from seeing through the display module.

2. A dual sided transparent display module in accordance with claim 1, wherein the shutter element is a second side shutter element located at the second side surface of the primary transparent display.

3. A dual sided transparent display module in accordance with claim 2, further comprising a first side shutter element located at the first side surface of the primary transparent display.

4. A dual sided transparent display module in accordance with claim 1, further comprising a secondary transparent display located at the second surface side of the primary transparent display.

5. A dual sided transparent display module in accordance with claim 4, wherein the shutter element is located on the second surface side of the primary transparent display between the primary transparent display and the secondary transparent display.

6. A dual sided transparent display module in accordance with claim 1, wherein each of the first touch sensor array and the second side touch sensor array are disposed on respective transparent substrates.

7. A dual sided transparent display module in accordance with claim 6, wherein the transparent substrates each include respective glass substrates.

8. A dual sided transparent display module in accordance with claim 7, wherein at least one of the first side touch sensor and the second side touch sensor includes a proximity touch sensor array, which is located between the corresponding glass substrate and the primary transparent display, which is adapted for detecting a location of a pointer element coming within proximity of the corresponding touch sensor and the respective glass substrate.

9. A dual sided transparent display module in accordance with claim 7, wherein at least one of the first side touch sensor and the second side touch sensor includes a force sensing touch sensor array, where the respective glass substrate is located between the force sensing touch sensor array and the primary transparent display, where the force sensing touch sensor array is adapted for detecting a location and an amount of force of a pointer element coming into contact with the corresponding touch sensor and the corresponding glass substrate.

10. A dual sided transparent display module in accordance with claim 1, further comprising one or more spacers located around at least portions of an exterior edge surface of the primary transparent display, wherein at least one or more of the first side touch sensor and any shutter element located at the first side surface of the primary transparent display is coupled to at least one of the one or more spacers, so as to be positioned a distance away from the primary transparent display, the distance being defined at least in part by the size and shape of at least one of the one or more spacers.

11. A dual sided transparent display module in accordance with claim 10, wherein the at least one or more of the first side touch sensor and any shutter element located at the first side surface of the primary transparent display is coupled to the at least one of the one or more spacers via one or more force sensors.

12. A dual sided transparent display module in accordance with claim 11, wherein respective ones of the one or more force sensors are located spaced apart around an outer periphery of the dual sided transparent display module.

13. A dual sided transparent display module in accordance with claim 12, wherein the one or more force sensors located spaced apart around the outer periphery of the dual sided transparent display module include one or more force sensors located proximate one or more respective corners of the primary transparent display.

14. A dual sided transparent display module in accordance with claim 12, wherein the one or more force sensors located spaced apart around the outer periphery of the dual sided transparent display module include one or more force sensors located proximate the midpoint of the longer outer edge of the primary transparent display.

15. A dual sided transparent display module in accordance with claim 12, further comprising one or more vibrational elements coupled to the at least one or more of the first side touch sensor and any shutter element located at the first side surface of the primary transparent display between adjacent ones of at least some of the spaced apart force sensors located around the outer periphery of the dual sided transparent display module.

16. A dual sided transparent display module in accordance with claim 12, wherein the at least one or more of the first side touch sensor and any shutter element located at the first side surface of the transparent display is coupled to the one or more force sensors via one or more vibrational elements located along respective sides of the outer periphery of the dual sided transparent display module.

17. A dual sided transparent display module in accordance with claim 10, further comprising one or more vibrational elements coupled to the at least one or more of the first side touch sensor and any shutter element located at the first side surface of the primary transparent display at one or more points proximate an outer periphery of the dual sided transparent display module.

18. A dual sided transparent display module in accordance with claim 10, further comprising one or more spacers located around at least portions of an exterior edge surface of the primary transparent display, wherein at least one or more of the second side touch sensor and any shutter element located at the second side surface of the primary transparent display is coupled to at least one of the one or more spacers, so as to be positioned a distance away from the primary transparent display, the distance being defined at least in part by the size and shape of the at least one of the one or more spacers.

19. A dual sided transparent display module in accordance with claim 18, wherein the at least one or more of the second side touch sensor and any shutter element located at the second side surface of the primary transparent display is coupled to the at least one of the one or more spacers via one or more force sensors.

20. A portable electronic device having a two part housing, where each part of the two part housing moves relative to the other part of the two part housing, the two part housing comprising:
   a first housing part including a dual sided transparent display module, the dual sided transparent display module including:
      a primary transparent display having a first surface side and a second surface side substantially parallel to an image plane;
      a first side touch sensor array and a second side touch sensor array respectively located at the first surface side and the second surface side of the primary transparent display; and
      a shutter element located at one of the first surface side and the second surface side of the transparent display, the shutter having a first state and a second state, wherein when the shutter is in the first state, the shutter enables one to see through the display module like a window, and wherein when the shutter is in the second state, the shutter becomes substantially opaque thereby precluding one from seeing through the display module; and
   a second housing part including a single sided display module, the single sided display module including a display having an image plane, and a touch sensor; and
   wherein the first housing part moves relative to the second housing, so as to have at least two use positions, where in a first use position the dual sided transparent display module of the first housing part at least partially overlaps in a direction perpendicular to the image plane of the primary transparent display with the display of the second housing part, and where in a second use position the dual sided transparent display module of the first housing part and the display of the second housing part do not substantially overlap in a direction perpendicular to the image plane of the primary transparent display.

* * * * *